UNITED STATES PATENT OFFICE.

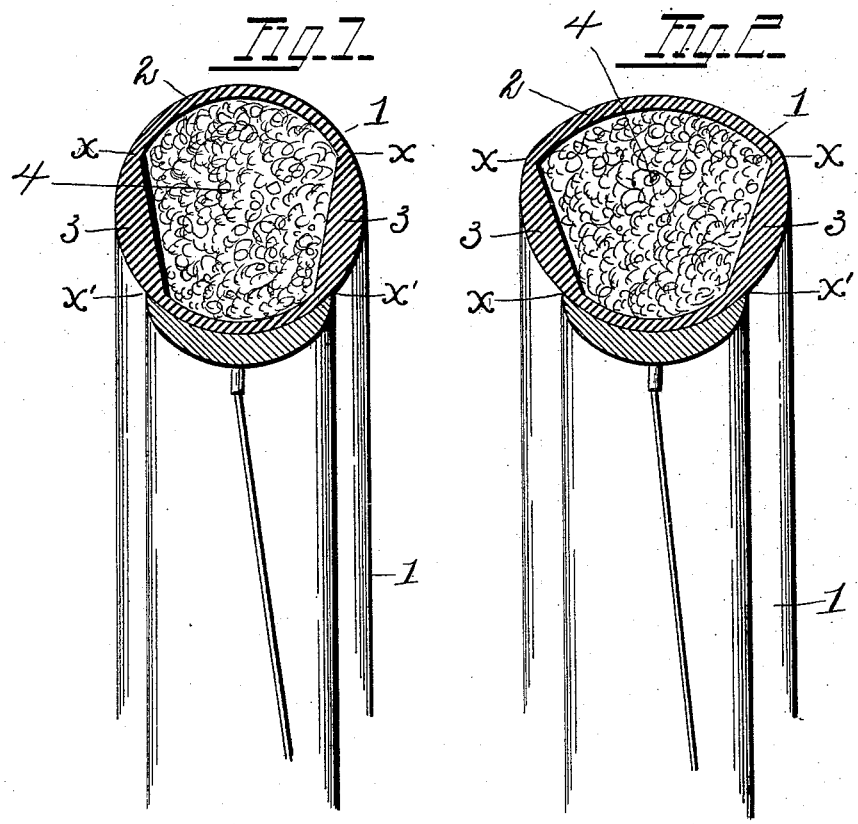

JOHN R. BOICE, OF TOLEDO, OHIO.

CUSHION-TIRE FOR VEHICLES.

SPECIFICATION forming part of Letters Patent No. 569,403, dated October 13, 1896.

Application filed June 1, 1896. Serial No. 593,704. (No model.)

*To all whom it may concern:*

Be it known that I, JOHN R. BOICE, of Toledo, county of Lucas, and State of Ohio, have invented certain new and useful Improvements in Cushion-Tires for Vehicles; and I do hereby declare that the following is a full, clear, and exact description of the invention, which will enable others skilled in the art to which it appertains to make and use the same, reference being had to the accompanying drawings, and to the figures and letters of reference marked thereon, which form part of this specification.

My invention relates to a cushion-tire for vehicles, and has special reference to tires in which is employed an outer tube or tread portion of rubber; and the invention relates to the form of the tube and the filling for the same.

The object of the invention is first to provide a filling for the tube which has an inherent resiliency to force the tire to its normal shape after being depressed by use.

The invention also consists in a novel form of tube whereby the depression of the tube when in use is radial toward the center, thereby increasing the tread portion.

With these objects in view the invention consists, first, in a filling for the tube composed of hair, which I have found to possess the inherent resiliency necessary to return to its original shape after being forced back by pressure; second, in forming the sides of the enveloping tube of greater thickness and rigidity than the tread portion, whereby the action will be, under pressure, to first depress the tread radially toward the hub of the wheel, which action forces the sides outwardly and thereby increases the tread portion and prevents contact of the tube near the edge of the rim of the wheel with the edge of the rim, and the consequent wearing of the tube at this point.

The invention further consists in the parts as shown, described, and claimed.

In the drawings, Figure 1 is a sectional elevation of a tire and rim illustrating my invention. Fig. 2 is a like view illustrating the action of the tube when depressed.

In carrying out my invention I employ any of the well-known forms of outer tube now in use, with the exception that the portion of the tube between the tread and the rim of the wheel is increased.

1 designates the tube, preferably formed of rubber, which comprises the tread portion 2, which is of sufficient thinness to allow the same to adapt itself to any unevenness and to prevent jar being conveyed to the vehicle. The tube is enlarged, as at 3, which causes sufficient stiffness to the sides of the same to prevent bending of the tube between the points $x\ x'$. Therefore when the tread of the tube is depressed the action will be to force the sides 3 outwardly, as shown in Fig. 2, and consequently the tread portion inwardly toward the axle. By this means abrasion of the tube at $x'$, due to contact with the edges of the rim, is prevented. Also the increased resiliency due to the increased thickness of the rubber upon the sides of the tube will have a normal tendency, aided by the filling when pressure is released from the tread of the tire, to resume its shape.

4 designates the filling comprised of hair, which I have found to possess an inherent resiliency, which will at all times resume its normal shape after being depressed and at the same time have a resiliency equal to that of air.

It will thus be seen that I have provided a cushion-tire for vehicles which is of few parts, the filling for which possesses a resiliency to give the desired cushion to the tire necessary to prevent jar being communicated to the vehicle, and that by the use of the particular filling employed and the particular form of enveloping tube that the tire will assume its normal shape after being depressed.

What I claim is—

In a cushion-tire for vehicles, a tube having an inner and an outer portion of a like thickness, the outer portion being of a greater width than the inner portion, and sides of a greater thickness connecting the outer and inner portions angled outwardly toward the periphery of the tube and a resilient filling for the interior of the tube.

In testimony that I claim the foregoing as my own I hereby affix my signature in presence of two witnesses.

JOHN R. BOICE.

Witnesses:
CARROLL J. WEBSTER,
MAUD SCHUMACHER.